United States Patent [19]

Follmer

[11] 4,044,293
[45] Aug. 23, 1977

[54] DUAL BATTERY CHARGING SYSTEM

[75] Inventor: William C. Follmer, Norristown, Pa.

[73] Assignee: Ford Aerospace & Communications Corporation, Dearborn, Mich.

[21] Appl. No.: 693,664

[22] Filed: June 7, 1976

Related U.S. Application Data

[63] Continuation of Ser. No. 552,435, Feb. 24, 1975, abandoned.

[51] Int. Cl.² .......................................... H02J 7/14
[52] U.S. Cl. ........................................ 320/15; 320/17; 320/61; 307/16
[58] Field of Search ................. 320/5, 15, 16, 17, 18, 320/61; 307/16

[56] References Cited

U.S. PATENT DOCUMENTS

| | | |
|---|---|---|
| 3,211,964 | 10/1965 | Thorne ................................. 317/151 |
| 3,624,480 | 11/1971 | Campbell .............................. 320/15 |
| 3,809,995 | 5/1974 | Hardin ................................ 320/17 X |

Primary Examiner—Robert J. Hickey
Attorney, Agent, or Firm—Robert D. Sanborn

[57] ABSTRACT

In an automotive system, using two batteries, a series connection is employed to obtain high engine starting energy. A novel regulator circuit is employed to charge the second or auxiliary starting battery without resorting to the manipulation of heavy duty switch contacts.

4 Claims, 3 Drawing Figures

DUAL BATTERY CHARGING SYSTEM

This application is a continuation of application Ser. No. 552,435, filed Feb. 24, 1975, now abandoned.

BACKGROUND OF THE INVENTION

It has been found that the conventional single battery automotive electrical systems are often inadequate for engine starting, particularly during cold weather and when the battery has been in use for a long time. Truck engines in particular are difficult to start and the problem is aggravated. It has been found that starting currents as high as 400 amperes can be encountered. It has become common to employ two batteries, particularly in commercial vehicles. One battery operates in the conventional manner and the second battery is connected in series with the regular battery when added starting energy is needed. Obviously a special arrangement must be used to charge the second or start booster battery. This is ordinarily done by connecting it in parallel with the regular battery thereby using the conventional charging mechanism. Since both battery terminals must be switched to change from series to parallel, and, since such switching must accommodate the high starting current circuitry, a heavy duty, double pole relay is usually located near the batteries. The relay is either operated automatically on starting, or from a panel-mounted switch that can be operated when the additional starting energy is deemed necessary. Such a relay is expensive because of the heavy duty current contacts and is subject to failure as is any electromechanical device. Failure propensity of the system is further enhanced by the requirement of making the heavy duty cable connections between the relay and batteries. The large number of schemes for battery switching show that a continuing problem exists in this area.

SUMMARY OF THE INVENTION

It is an object of the invention to provide for charging a starting boost battery in a conventional automotive system wherein the boost battery is permanently connected in series with the regular battery.

It is a further object of the invention to employ a conventional automotive alternator i.e., an alternator rectifier to charge a pair of series-connected batteries with the starting booster battery being by-passed to avoid overcharge when it is charged to its capacity.

These and other objects are achieved in the following manner. A conventional alternator, regulator, and battery combination is connected in the usual way except that the alternator output is connected to a starting battery that is connected in series-aiding configuration to the conventional battery. Thus the alternator charges the series combination in response to the charging requirements of the conventional battery. Alternator characteristics are such that this charging action is easily feasible. A separate starting battery regulator is connected to sense the state of charge in the starting battery. When a full charge is achieved, the starting battery is by-passed out of the circuit so that the alternator is connected only to the conventional battery. A reverse current arrestor means is connected to the starting battery so that the by-pass circuit will not discharge it. This mode of connection assures that the conventional battery is charged as needed. Since the starting battery is used in series with the conventional battery, it is drained only during the starting interval and will naturally not need as much recharging. Therefore, it is feasible to merely charged the pair in series and then by-pass the starting battery to take it out of the charging circuit when it is fully charged.

From the above it can be seen that the charging circuit operates on the two batteries permanently connected in series thereby eliminating the expensive and unreliable heavy duty relay and high current connections that are normally associated with the starting battery.

DESCRIPTION OF THE INVENTION

Figure 1:
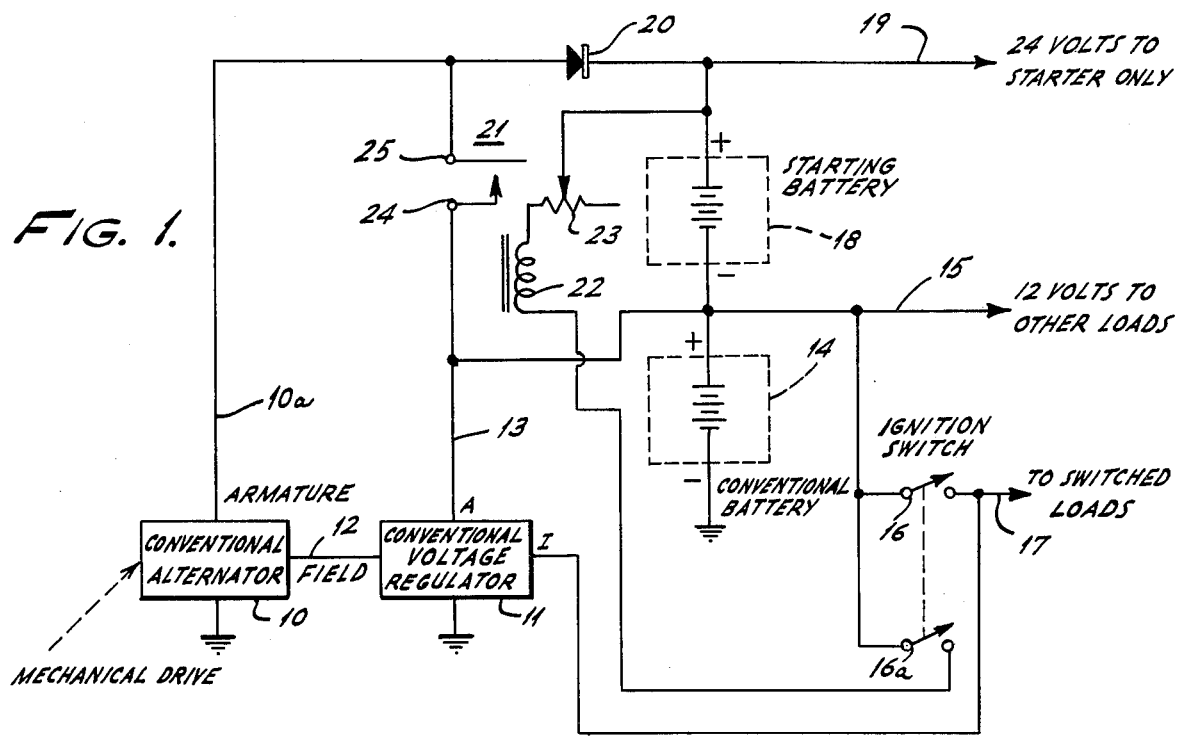
FIG. 1 is a diagram of the circuit of the invention.

FIG. 1 is a circuit, partly in schematic and partly in block diagram form, showing a battery charging system using the invention. A conventional alternator 10 is shown mechanically driven. The drive would be obtained from a vehicle engine. A conventional voltage regulator 11 controls the alternator output by way of its field connection on line 12. The regulator sense line 13 is connected to the conventional vehicle battery 14 has shown. This battery operates the vehicles 12-volt loads on line 15. The ignition switch contacts 16 operate the switched vehicle loads on line 17 which is also connected to the ignition switch terminal of regulator 11. All of the elements and connections described thus far are conventional vehicular circuits and components.

In order to provide a more energetic engine starting system a starting battery 18 is series connected with battery 14 and the combination connected to the vehicle starting system (not shown) by way of line 19. Thus a two-battery, or typically, 24-volt starting source is available.

The series-connected battery combination is connected by way of diode 20 to the armature line 10a, or output, of alternator 10. Thus alternator 10 will charge batteries 14 and 18 in series through diode 20 which is poled in its forward conduction direction for charging current. Diode 20 is a conventional silicon diode having a reverse breakdown of 200 volts or better and a forward conduction rating of 55 amperes or greater. It will be noted that the two batteries will be charged in response to the charge state of battery 14.

To avoid overcharging battery 18, relay 21 is included in the circuit. Coil 22 of relay 21 is connected by way of rheostat 23 and ignition switch contacts 16a across battery 18. The relay characteristics in conjunction with the setting of rheostat 23 are established so that when the voltage between the terminals of battery 18 is about 14.4 volts (which represents a fully charged so-called 12-volt battery) the normally open relay contacts 24–25 will close. For this condition the alternator current is by-passed around battery 18 to battery 14. Thus when battery 18 becomes fully charged the charging circuit reverts to that of the conventional battery system and the starting battery will then await a call for a starting operation. The current drain coil 22 imposes on battery 18 is small enough that it can be regarded as negligible. However, when the ignition switch is turned off contacts 16a will be open and coil 22 is disconnected from battery 18 thereby avoiding even the light relay coil current drain. When relay contacts 24–25 are closed, diode 20 is back biased and therefore non-conductive. This prevents the discharge of battery 18 through the relay contacts. While the series batteries may be required to supply a 400-ampere starting current, relay 21 need only be rated for the charging current which is on the order of 55 amperes at most. Thus the starting current flows only through permanently made, unswitched battery circuitry.

The relay characterisitics and adjustments are selected so that when the voltage at the terminals of battery 18 drop below about 12.2 volts, relay 21 will no longer hold and contacts 24–25 will open, thus connecting battery 18 back into the charging circuit as described above.

Figure 2:
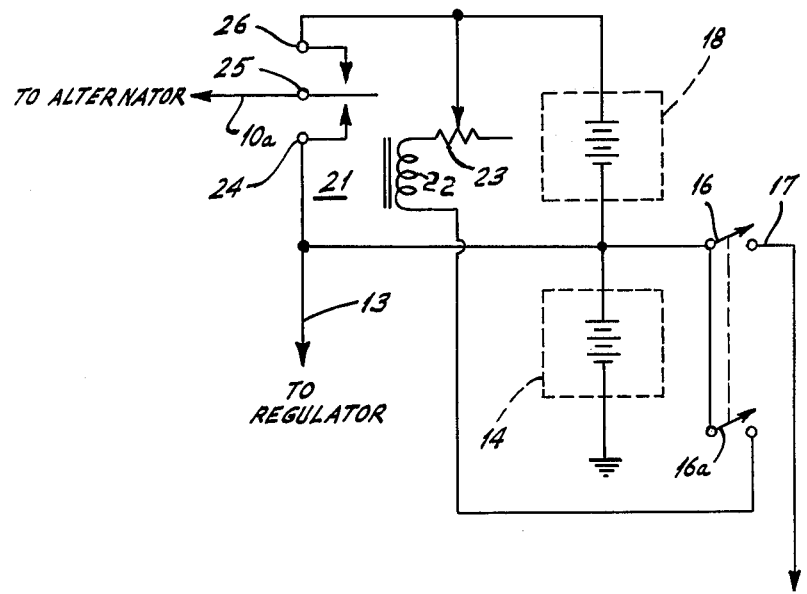
FIG. 2 is a modified form of FIG. 1.

In FIG. 2 a modified relay circuit is shown. The relay has an added contact 26 making it a SPDT device. In addition to normally open contacts 24–25, normally closed contacts 25–26 are used to replace diode 20. When the current through coil 22 is below the relay hold in range, the upper contact 26 will be closed against contact 25 and both batteries will charge. When battery 18 becomes charged, and the relay is energized, contact 24 will be closed against contact 25 thereby by-passing the charging current to battery 14 alone. While relay 21 is energized, contact 26 will be open thereby preventing the discharge of battery 18. Otherwise FIG. 2 operates as does FIG. 1.

The above-described circuit is feasible because battery 18 will always be discharged to a lesser extent than battery 14. This is true because both are discharged equally in the starting operation and battery 14 is also discharged by the load connected to lines 15 and 17. Therefore, if the charging demand is adjusted by regulator 11 to keep battery 14 charged, it is only necessary to by-pass battery 18 out of the charging circuit when it is fully charged.

Figure 3:
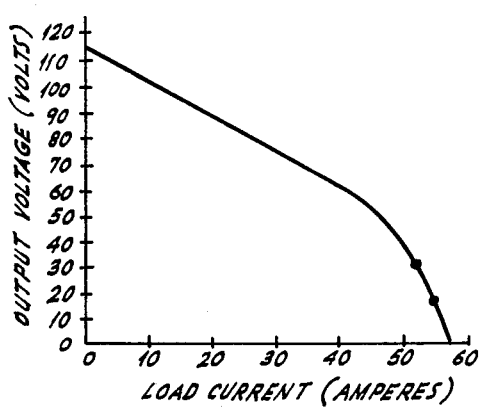
FIG. 3 is a graph showing the current-voltage characteristics of a typical alternator.

FIG. 3 is a graph showing the performance characteristics of a typical alternator and is included to show the feasibility of charging two series connected batteries. The FIG. 3 graph was obtained from data taken on a conventional 55-ampere automotive alternator driven at 6200 r.p.m. and supplied with a field current of 3.0 amperes. It can be seen that the no load voltage is about 115 volts. The voltage declines linearly with increasing load until a 40 ampere load is reached whereupon the rate of decline in voltage increases with increased load. Point A represents the 29 volt level which would relate to two fully-charged series-connected batteries. At this point the load is 52 amperes. The 14.5-volt one-battery level, as shown at point B, occurs at 55 amperes. Thus two batteries can be accommodated with only a 5.5% decline in available alternator current capability. This shows that a conventional alternator, used in the circuit of FIG. 1, can easily charge the two series-connected batteries.

Thus a two-battery high-energy engine starting system can be operated in a conventional automotive system without having to use a switch that must operate at the high starting currents. This results in a much simpler system of higher reliability.

While a functional circuit for performing the required battery charging has been set forth, alternatives and equivalents will occur to a person skilled in the art. For example, relay 21 could be replaced by well known solid state components. The contacts could be replaced by a silicon controlled rectifiers or similar device whosw switching is controlled with a transistor voltage sensing circuit of conventional design. Furthermore while the above description relates to automotive applications, the invention applies to any prime mover equipped with electrical start and battery charging. While 12-volt batteries are shown other values could be used. Accordingly, it is intended that my invention be limited only by the following claims.

I claim:

1. In an engine electrical system including first and second series connected batteries, said first battery being connected between a first end terminal and an intermediate terminal of said series combination and said second battery being connected between said intermediate terminal and a second end terminal of said series combination, an alternator-rectifier combination providing between first and second alternator output terminals associated with a single charging path a direct current output at a voltage dependent upon a voltage control signal supplied to said alternator-rectifier combination and means for selectively charging only said first battery or both of said batteries in series with energy supplied between said first and second output terminals, said charging means comprising means connecting said first end terminal of said series connected batteries to said first alternator output terminal, voltage regulator means connected to said intermediate terminal of said series connected batteries and to said alternator-rectifier combination for suplying said voltage control signal to said alternator-rectifier combination, voltage controlled switch means connected between said second alternator output terminal and said intermediate terminal of said series connected batteries and responsive to the voltage appearing across said battery for alternatively connecting said second alternator output terminal to said intermediate terminal through said switch means thereby to permit current flow from said second terminal through said first battery and disconnecting said second alternator output terminal from said intermediate terminal, and current control means connecting said second alternator output terminal and said second end terminal of said series connected battery combination, said last mentioned means permitting current to flow in a selected direction to said series connected batteries when said switch means is operative to disconnect said second alternator output terminal from said intermediate terminal and to prevent flow of current in the reverse direction when said switch means is operative to connect said second alternator output terminal to said intermediate terminal.

2. The circuit of claim 1 wherein said voltage controlled switch means comprises a relay having an operating coil connected between said second terminal and said intermediate terminal of said series connected battery combination and a pair of normally open contacts connected to said intermediate terminal and to said second alternator output terminal, said operating coil being adapted to cause said contacts to close in response to a predetermined voltage appearing across said second battery.

3. The circuit of claim 2 wherein said current control means of claim 1 comprises a blocking diode connected between said second alternator outut terminal and said second end terminal of said series connected battery combination, said blocking diode being poled to pass current in a direction representing charging current for said second battery.

4. The circuit of claim 2 wherein said current control means of claim 1 comprises normally closed contacts on said relay which are held open by said operating coil during the time said normally open contacts are closed.

* * * * *